(12) United States Patent
Salazar Altamar et al.

(10) Patent No.: US 12,508,232 B2
(45) Date of Patent: Dec. 30, 2025

(54) PRE-FILLING SYSTEM TO ELIMINATE BUBBLES INSIDE CAPSULES HAVING A SOLID DOSAGE FORMS WITHIN SAID CAPSULES

(71) Applicants: Carlos Salazar Altamar, Barranquilla (CO); Braulio Fabián Terán Padrón, Barranquilla (CO); José Alexander García Guzmán, Barranquilla (CO); Gustavo Enrique Anaya Romero, Soledad (CO); Ivan Dario Romero Yepez, Barranquilla (CO)

(72) Inventors: Carlos Salazar Altamar, Barranquilla (CO); Braulio Fabián Terán Padrón, Barranquilla (CO); José Alexander García Guzmán, Barranquilla (CO); Gustavo Enrique Anaya Romero, Soledad (CO); Ivan Dario Romero Yepez, Barranquilla (CO)

(73) Assignee: PROCAPS SA, Barranquilla (CO)

( * ) Notice: Subject to any disclaimer, the term of this patent is extended or adjusted under 35 U.S.C. 154(b) by 0 days.

(21) Appl. No.: 17/697,880

(22) Filed: Mar. 17, 2022

(65) Prior Publication Data

US 2022/0296529 A1 Sep. 22, 2022

Related U.S. Application Data

(60) Provisional application No. 63/162,080, filed on Mar. 17, 2021.

(51) Int. Cl.
*A61K 9/48* (2006.01)
*A61J 3/07* (2006.01)
(Continued)

(52) U.S. Cl.
CPC ............. *A61K 9/4833* (2013.01); *A61J 3/074* (2013.01); *A61K 9/4875* (2013.01);
(Continued)

(58) Field of Classification Search
CPC ........... A61J 3/07; A61J 3/074; A61K 9/4825; A61K 9/4833; A61K 9/4875; A61K 9/5084
See application file for complete search history.

(56) References Cited

U.S. PATENT DOCUMENTS 2,288,327 A * 6/1942 Scherer ................. A61J 3/07
264/DIG. 37
2,497,212 A * 2/1950 Donofrio .............. B29C 51/445
425/513
(Continued)

*Primary Examiner* — Robert F Long
*Assistant Examiner* — Eduardo R Ferrero
(74) *Attorney, Agent, or Firm* — Isaac A Angres

(57) ABSTRACT

The invention provides a rotary die mold process for manufacturing softgel capsules incorporating another solid form within said capsule and wherein said softgel capsule is free of air bubbles, in which at least two material strips are brought together by means of counter-running forming rolls and formed into capsules, a liquid and solid filling material being introduced via a filling wedge segment comprising two concave wedge surfaces; a filling medicine inlet; a fill medicine outlet; an output of solids and pre-fill medicine; a solids feed channel and pre-fill medicine; a pre-filling medicine inlet and a solids inlet. A softgel capsule free of air bubbles having incorporated within said capsule a second solid form, said second solid form being the form of a tablet.

7 Claims, 12 Drawing Sheets

(51) Int. Cl.
*A61K 9/50* (2006.01)
*A61K 45/06* (2006.01)

(52) U.S. Cl.
CPC ............ *A61K 9/5084* (2013.01); *A61K 45/06* (2013.01); *A61K 9/4825* (2013.01)

(56) References Cited

U.S. PATENT DOCUMENTS

| | | | | |
|---|---|---|---|---|
| 2,608,405 | A * | 8/1952 | Kopald | B65B 41/16 198/780 |
| 3,228,789 | A * | 1/1966 | Glassman | A61K 9/4891 427/399 |
| 4,281,763 | A * | 8/1981 | Pace | A61J 3/072 220/8 |
| 4,567,714 | A * | 2/1986 | Chasman | A61J 3/07 53/529 |
| 4,609,403 | A * | 9/1986 | Wittwer | A61J 3/07 425/804 |
| 5,146,730 | A * | 9/1992 | Sadek | A61J 3/10 53/553 |
| 5,200,191 | A * | 4/1993 | Steele | A61J 3/07 264/4.4 |
| 5,761,886 | A * | 6/1998 | Parkhideh | A61J 3/07 53/140 |
| 6,482,516 | B1 * | 11/2002 | Sadek | B30B 11/34 424/463 |
| 6,574,945 | B2 * | 6/2003 | Martinez, Jr. | B65B 29/10 53/239 |
| 8,967,989 | B2 * | 3/2015 | Altamar | A61J 3/07 424/408 |
| 8,974,820 | B2 * | 3/2015 | Altamar | A61K 9/4808 424/458 |
| 9,433,584 | B2 * | 9/2016 | Salazar Altamar | B65D 83/04 |
| 10,383,826 | B2 * | 8/2019 | Salazar Altamar | A61P 43/00 |
| 2003/0085487 | A1 * | 5/2003 | Tanner | A61K 9/4816 264/212 |
| 2003/0138482 | A1 * | 7/2003 | Fonkwe | A61K 9/4816 106/162.1 |
| 2003/0232097 | A1 * | 12/2003 | Radhakrishnan | A61K 31/192 424/769 |
| 2012/0049410 | A1 * | 3/2012 | Altamar | A61K 9/4833 264/294 |
| 2012/0052118 | A1 * | 3/2012 | Altamar | A61J 7/0076 221/210 |
| 2012/0058179 | A1 * | 3/2012 | Altamar | A61K 9/4808 425/5 |
| 2012/0301546 | A1 * | 11/2012 | Hassan | A23L 33/10 426/103 |
| 2014/0352878 | A1 * | 12/2014 | Contreras Julio | B30B 11/16 156/383 |
| 2014/0353881 | A1 * | 12/2014 | Salazar Altamar | A61J 3/074 222/255 |
| 2015/0119473 | A1 * | 4/2015 | Shuai | A61K 47/36 514/778 |
| 2015/0164814 | A1 * | 6/2015 | Salazar Altamar | A61K 9/4833 514/460 |
| 2015/0174008 | A1 * | 6/2015 | Salazar Altamar | A61K 9/4808 425/5 |
| 2016/0193151 | A1 * | 7/2016 | Noriega Escobar | A61K 31/192 562/460 |
| 2017/0095425 | A1 * | 4/2017 | Salazar Altamar | A61K 9/4833 |
| 2017/0239142 | A1 * | 8/2017 | Fulper | F04B 19/14 |
| 2018/0021286 | A1 * | 1/2018 | Rashid | A61K 47/26 424/453 |
| 2018/0263916 | A1 * | 9/2018 | Guo | A61K 47/32 |
| 2018/0353383 | A1 * | 12/2018 | Altamar | A61J 3/07 |
| 2019/0365654 | A1 * | 12/2019 | Salazar Altamar | B65D 83/04 |
| 2021/0046013 | A1 * | 2/2021 | Ahmad | A61K 9/4816 |
| 2021/0378970 | A1 * | 12/2021 | Lin | A61P 1/12 |
| 2021/0400979 | A1 * | 12/2021 | Angres | A01N 59/16 |
| 2022/0023225 | A1 * | 1/2022 | Salazar Altamar | A61K 9/4858 |
| 2022/0096388 | A1 * | 3/2022 | Fulper | A61K 9/4833 |
| 2022/0296529 | A1 * | 9/2022 | Salazar Altamar | A61K 45/06 |
| 2023/0165757 | A1 * | 6/2023 | Fulper | A61J 3/07 425/5 |

* cited by examiner

PRE-FILLING SYSTEM TO ELIMINATE BUBBLES INSIDE CAPSULES HAVING A SOLID DOSAGE FORMS WITHIN SAID CAPSULES

This application claims the priority benefit under 35 U.S.C. section 119 of U.S. Provisional Patent Application No. 63/162,080 entitled "Pre-Filling System To Eliminate Bubbles Inside Capsules Having A Solid Dosage Forms Within Said Capsules" filed Mar. 17, 2021, which is in its entirety herein incorporated by reference.

FIELD OF THE INVENTION

This invention relates to methods and apparatus for the production of soft gelatin capsules containing internally other solid dosage forms or smaller capsules within said capsules which capsules are of air bubbles. The capsules of the invention are now well established as a means for providing a variety of liquid products such as drugs and dietary supplements in a readily ingestible form especially when two drugs are not compatible with each other.

This invention further relates to softgels (or soft gelatin capsules) containing one or more smaller capsules or other solid forms within such capsules and to a process and apparatus for the manufacture thereof wherein said capsules are free of air bubbles. The present invention also relates to a gelatin capsule of the soft type and free of air bubbles containing multiple active ingredients or the like, and more particularly to a novel gelatin capsule capable of containing multiple medicines or dietary supplement as the content separated from each other, and its manufacturing method and manufacturing apparatus.

The present invention also relates generally to a method and apparatus for forming capsules within capsules which are free of air bubbles containing a measured amount of not compatible medicinals and more particularly to a method and apparatus for forming capsules which are free of air bubbles.

The method and apparatus of the present invention are particularly useful in connection with forming softgel capsules having other solid dosage forms and free of air bubbles containing multiple pharmaceutical product, such as for example medicines, vitamins, food supplements and the like which are not compatible with each other.

The present invention further relates to encapsulation machines and, more particularly, to soft encapsulation machines which make soft gelatin capsules free of air bubbles having other smaller capsules within or other solid dosage form.

The invention is particularly useful for making formulations wherein two active ingredients are not compatible with each other but it is desirable to administer them in the same dosage form i.e., a capsule within a capsule or another solid dosage form within a capsule wherein said capsules are free of air bubbles.

BACKGROUND OF THE INVENTION

The art of encapsulation has been known for many years, particularly for the production of unit dosage forms containing various pharmaceutical products. Normally, such pharmaceutical capsules are composed of gelatin or some modification thereof, which is fabricated essentially into two different forms, namely, the so-called hard gelatin capsule and the soft gelatin capsule.

It is also known that conventional soft gelatin capsules are a preferred from of administration for medicaments and similar products; especially liquids, pastes, solids dispersed in liquids, or dry solids. Soft gelatin capsules also possess particular advantages for substances which require total protection from air and light, because the gelatin is completely sealed around the contents. An important example is for the encapsulation of vitamins, which has resulted in a high degree of stability thereof.

Hard gelatin capsules are also known in the art, and are generally formed from two distinct parts, namely the "cap" and the "body", fitting one into the other so as to form the complete capsule. The cap and the body are manufactured by the same process consisting of immersing in a gelatin solution the end of a mandrel whose form corresponds to the inner volume of the cap or of the body, then withdrawing the mandrel from the solution and letting the layer of gelatin thus deposited dry, which is then removed like a glove finger. Hard shell capsules so formed have problems of leakage and do not provide adequate protection from air and light Soft gelatin capsules, now more commonly known as softgels, have been well known and widely used for many years. Softgels generally comprise an outer shell primarily made of gelatin, a plasticizer, and water, and a fill contained within the shell. The fill may be selected from any of a wide variety of substances that are compatible with the gelatin shell. Softgels are widely used in the pharmaceutical industry as an oral dosage form containing many different types of pharmaceutical and vitamin products. In addition to use as an oral dosage form for drugs and vitamins, soft gelatin capsules or softgels are also designed for use as suppositories for rectal or vaginal use. Other uses are for topical and ophthalmic preparations and the like. The cosmetic industry also uses softgels as a specialized package for various types of perfumes, oils, shampoos, skin creams and the like. Softgels are available in a great variety of sizes and shapes, including round shapes, oval shapes, oblong shapes, tube shapes and other special types of shapes such as stars. The finished capsules or softgels can be made in a variety of colors. Also, opacifiers may be added to the shell.

The process for making softgel capsules includes the step wherein the gelatin shell and the fill material come together to form Softgel capsules. It takes place in a closed environment called clean room where the relative humidity is around 20%. The gelatin shell and fill material are brought together simultaneously in the encapsulation machine.

The process is basically performed as follows: a pump delivers the warm gelatin over two chilled drums which are located at both opposite sides of the machine, through a spreader box that sits over each drum. The warm liquid gelatin flows over the drums and this transforms the liquid gelatin into two solid ribbons of gel. The left and right ribbons pass over rollers which feed them through two die rolls. These die rolls determine the shape and size of softgels and cut the Softgel shell from the ribbons as they turn around.

Simultaneously, a sensitive and high accuracy positive displacement pump delivers the fill material into a heated wedge which sits between rotary dies. This wedge injects the fill material into the die cavities between ribbons just right before the die rolls cut the ribbons and seal the two halves together. Warm just formed softgels slide gently through a chute onto a conveyor belt which carries them to the tumble dryer where cooling and drying process takes place.

In more specific detail, typical soft encapsulation machines form at least two flexible gelatin sheets or ribbons by cooling molten gelatin on separate drums then lubricating and guiding the sheets into communication with each other over co-acting dies while simultaneously dispensing a desired quantity of fill material between the sheets in synch with cavities in the outer surfaces of the dies to produce soft capsules. The encapsulation machines typically utilize gearing to control the relative rotations of the various components and fill mechanisms to synchronize the operation of these various components. The synchronization of these various components, however, can vary depending upon a variety of factors, such as the particular dies used, the number of cavities and the size of the cavities on the dies, and the type of material used to form the sheets. To change the synchronization of the various components, mechanical gears are required to be changed to obtain the desired ratios and synchronization of these components. The changing of gears, however, is time intensive. Additionally, the use of mechanical gears provides finite gear ratios which limit the synchronization of the various components to the mechanical gears that are available. Thus, it would be advantageous to provide a capsule machine wherein the synchronization and rates at which the various components operate can be altered without the necessity of changing gears. Additionally, it would be advantageous if the synchronization between the various components can be infinite to thereby allow more precise synchronization between the various components. It would also be advantageous to allow various components, such as the fill mechanism, to be adjusted independently of the other components while the machine is running to allow for adjustments of the timing of fill material inserted into each of the soft capsules. It would also be advantageous to eliminate the use of casting drums in the making of softgel capsules.

During the operation of the capsule making machine, the contact between the adjacent dies can be adjusted by the operator of the capsule making machine. Typically, the operator is able to move one of the dies closer to the other die so that the pressure or force exerted on the sheets passing between the adjacent dies can be adjusted. Such adjustments, typically are mechanical adjustments made by fluid actuators, such as pneumatic cylinders. The operator is able to adjust the pneumatic pressure thereby altering the force the dies exert on one another and on the sheets. This adjustability allows an operator to customize the pressure to ensure that quality soft capsules are produced. However, the dies are susceptible to premature failure and/or wear when the pressure or force between the two dies is more than that required to produce acceptable soft capsules. Thus, it would be advantageous to monitor/record the pressure applied to the dies so that quality capsules are produced without inducing excessive wear or premature wear on the dies.

A material fill mechanism is used to supply the fill material that is encapsulated within the soft capsules. When the fill material is a liquid, such as a liquid medication or die for a paint ball capsule, the fill mechanism includes a plurality of positive displacement plunger-type pumps that are arranged in a housing above the dies. The plunger-type pumps are positioned on a yoke that moves linearly in a reciprocating motion to allow the plunger-type pump to fill with the liquid fill material on one stroke and subsequently discharge the liquid fill material on the other stroke. A valving arrangement between opposing pumps is utilized to control the discharge and filling of the pumps. The valve arrangement includes a sliding member that moves linearly back and forth in a direction generally perpendicular to the linear motion of the yoke. The discharge of the liquid fill material into the sheets as they are passing through the dies is coordinated with the operation of the dies to insure that the timing of the injection of the liquid fill material is synchronized with the cavities on the dies. Typically, this synchronization has been performed through the use of mechanical gears that link the timing of the stroke to the rotation of the dies. Thus, in order to adjust the synchronization a mechanical gear change is required which is time consuming. Additionally, the timing is limited to a finite number of gear ratios as determined by the gears that are available.

The sliding member of the valving mechanism requires lubrication. Typically, the lubrication is provided by a lubricating pump with its own separate drive. However, the use of a separate drive to operate the lubricating pump adds additional complexity and components to the capsule machine. Thus, it would be advantageous if a motion of the slide member and/or the yoke could be utilized to drive the lubrication pump.

The pumps are typically contained within a housing that is filled with a lubricating oil that is used to lubricate the sliding member. The pumps, however, can leak around their seals and contaminate the lubricating oil with the leaking fill material. Contamination of the oil requires a time consuming and possibly difficult clean up and can cause the lubricating oil to not perform as designed thereby increasing the wear on the sliding surfaces and decreasing the life span of the sliding surfaces. Thus, it would be advantageous to capture any fill material that leaks from the pumps and deter or prevent the liquid fill material from contaminating the lubricating oil within the pump housing.

The pumps are typically driven by a drive mechanism that is also located within the pump housing. Because the drive mechanism is located in the pump housing, it is possible for liquid fill material that leaks from the pumps to contaminate not only the lubrication oil but also the drive mechanism. When switching from one fill material to another, the pump and all of the components in the pump housing are required to be thoroughly cleaned to remove all contamination. The locating of the drive mechanism within the pump housing provides additional components that must also be cleaned when changing the fill material. Thus, it would be advantageous to separate the drive mechanism from the pump housing to reduce the components that are required to be cleaned when changing fill material.

The soft capsules produced by the encapsulation machine are transported from the encapsulation machine to a dryer to additionally dry the soft capsules and to make them into final form. The soft capsules are transported from the encapsulation machine to the dryer by a conveyor that extends along the front of the encapsulation machine. The conveyor can be contaminated by the fill material during operation of the encapsulation machine. When it is desired to switch the product being produced on the encapsulation machine, the conveyor must be removed from the encapsulation machine and cleaned to remove any contaminates thereon. The conveyor is driven by a motor that is attached to the conveyor. When it is necessary to remove the conveyor for cleaning, the motor must also be taken with the conveyor which makes it more difficult to remove and transport the conveyor and requires additional time to disconnect the motor from the encapsulation machine. The present invention provides an encapsulation machine that overcomes the above-described disadvantages of typical encapsulation machines.

Applicant is aware of the following publications briefly discussed below. U.S. Pat. No. 1,970,396 features a method and machine for producing soft gelatin capsules in an automated process. The method involves the formation of two gelatin sheets or films through the use of a gravity fed spreader box, cooling the liquid gelatin on two separate webs, then lubricating and guiding the two sheets into communication with each other between two co-acting dies while simultaneously dispensing the proper amount of medicine or other filling material between the sheets in registration with half cavities in the outer surface of the dies.

U.S. Pat. No. 5,761,886 discloses an apparatus for forming capsules that provides rotary dies that are independently moveable and the ability to vary the speed of the dies during the formation of a single capsule. The '886 device also utilizes independently controlled casting drums to reduce "set-up" time and provide better quality control. Even though the '886 patent discloses a very sophisticated encapsulation machine, it still utilizes a gravity fed spreader box for formation of the encapsulating ribbon.

Other patents relating to encapsulation techniques which disclose the use of spreader boxes to create the film or ribbon on a casting drum include U.S. Pat. Nos. 2,288,327; 2,774,988; 5,246,638; 5,735,105; and 6,022,499.

Additionally, fixed-dose combinations are the preferred approach to simplify the disease management for chronic diseases (e.g., HIV, asthma, diabetes, lipid regulation, hypertension) by reducing the number of dosage intake and improving efficacy through the synergistic effect of active compound's mechanisms of action (see M. Sadia, A. Isreb, I. Abbadi, M. Isreb, D. Aziz, A. Selo, P. Timmins, M. A. Alhnan, From 'fixed dose combinations' to 'a dynamic dose combiner': 3D printed bi-layer antihypertensive tablets, *Eur. J. Pharm. Sci.* 123 (2018) 484-494; J. M. Castellano, G. Sanz, J. L. Peñalvo, S. Bansilal, A. Fernández-Ortiz, L. Alvarez, L. Guzmán, J. C. Linares, F. Garcia, F. D'Aniello, J. A. Arnáiz, S. Varea, F. Martinez, A. Lorenzatti, I. Imaz, L. M. Sánchez-Gómez, M. C. Roncaglioni, M. Baviera, S. C. Smith, K. Taubert, S. Pocock, C. Brotons, M. E. Farko, V. Fuster, A polypill strategy to improve adherence, *J. Am. Coll. Cardiol.* 64 (2014) 2071-2082 and C. Laurent, C. Kouanfack, P. S. Koulla-Shiro, N. Nkoué, A. Bourgeois, A. Calmy, B. Lactuock, V. Nzeusseu, R. Mougnutou, G. Peytavin, F. Liégeois, E. Nerrienet, M. Tardy, M. Peeters, I. Andrieux-Meyer, L. Zekeng, P. M. Kazatchkine, E. Mpoudi-Ngolé, P. E. Delaporte, Effectiveness and safety of a generic fixed-dose combination of nevirapine, stavudine, and lamivudine in HIV-1-infected adults in Cameroon: Open-label multicentre trial, *Lancet.* 364 (2004) 29-34).

Conversely, fixed-dose combinations can offer a more cost-effective therapeutic option than monotherapy by reducing manufacturing, packaging, and distribution costs and may serve as a viable strategy for patent life cycle management (see D. Desai, J. Wang, H. Wen, X. Li, P. Timmins, Formulation design, challenges, and development considerations for fixed dose combination (FDC) of oral solid dosage forms, *Pharm. Dev. Technol.* 18 (2013) 1265-1276). Although there are some approaches for the design and manufacturing of Fixed-Dose combinations, multilayer tablets are the most common dosage design for administering incompatible pharmaceutical compounds in a single dosage due to the inherent flexibility in terms of release profiles and dissolution modes that can be incorporated into the tablet layers (see P. Shende, C. Shrawne, R. S. Gaud, Multi-layer tablet: Current scenario and recent advances, Int. *J. Drug Deliv.* 4 (2012) 418-426). However, the fabrication of multilayered tablets introduces various challenges that need to be considered for achieving optimal manufacturing at an industrial scale. Layer separation due to insufficient adhesion integrity (see N. Kottala, A. Abebe, O. Sprockel, I. Akseli, F. Nikfar, A. M. Cuitiño, Influence of compaction properties and interfacial topography on the performance of bilayer tablets, *Int. J. Pharm.* 436 (2012) 171-178) is a clear example of such issues that can occur during different stages of the value chain. It is generally caused by capping or delamination at the interface of the two layers (see C. Y. Wu, J. P. K. Seville, A comparative study of compaction properties of binary and bilayer tablets, *Powder Technol.* 189 (2009) 285-294). Depending on formulation design and process control, weak interfacial planes are formed during tablet compression that can lead to an increase in the susceptibility of fracture in specific tablet mechanical stress conditions during fabrication, packaging, or transport (see F. Podczeck, Theoretical and experimental investigations into the delamination tendencies of bilayer tablets, *Int. J. Pharm.* 408 (2011) 102-112 and I. Akseli, A. Abebe, O. Sprockel, A. M. Cuitiño, Mechanistic characterization of bilayer tablet formulations, *Powder Technol.* 236 (2013) 30-36). Product recalls might result in financial losses to pharmaceutical companies, and product defects could also have a significant effect on patient adherence to medication. Besides, current process technologies for multilayer tablet manufacturing demand for additional controls (independent weight and force control, quality defects) to ensure high-quality final product, whereas final yields are closer to 85% in contrast to state-of-the-art tablet presses equipment where reported efficiencies are higher than 99% for conventional single-layer tablets (see M. Behrens, J. Calvin, D. Kirsch, Multi-layer tablets: A piece of cake, *Pharm. Technol. Eur.* 24 (2012), M. Bundenthal, Optimizing Yields on Modern Tablet Presses, *Pharm. Technol.* 41 (2017) and S. R. Vaithiyalingam, V. A. Sayeed, Critical factors in manufacturing multi-layer tablets-Assessing material attributes, in-process controls, manufacturing process and product performance, *Int. J. Pharm.* 398 (2010) 9-13).

Due to the aforementioned issues related to the fabrication of multilayer tablets, several attempts to incorporate multiple active compounds into other types of oral dosages have been reported in state-of-the-art. Soft gelatin capsules enable the secure and accurate dosing of liquid formulations of active ingredients into a gelatin shell enclosing. This oral dosage is a promissory alternative most customers prefer due to its palatability, chemical stability, and marketable appearance. Attempts to manufacture liquid dose combinations of incompatible APIs in soft gelatin capsules have been previously disclosed by introducing intermediate gelatin layers to separate chambers where the different active compounds are located. While these look like a suitable alternative, not all active compounds can be dissolved into adequate liquid volume, and large differences between the APIs liquid volume dosing could be troublesome for the capsule's design.

Other proposed solutions include incorporating tablets and smaller soft capsules into larger soft gelatin capsules. U.S. Pat. No. 9,844,512 B2 discloses an apparatus to fabricate such capsules. It includes the means to deform a gelatin film in a traditional encapsulation machine to generate a cavity where the tablets coming from a dosing guide roller fall and are transported in said cavities due to the advance of the gelatin film by the system. While this seems like a promissory technical solution, a constant deformation of the gelatin ribbon is required so that the tablets can enter the cavities of said ribbon to the encapsulation machine wedge. The constant deformation of the gelatin ribbon generates small air volume spaces enclosed and transported into the soft gelatin capsule's formation space, thus generating excessively large air bubbles inside. Feeding the tablets outside the machine's wedge will generate entrained air bubbles. A similar problem is presented in the apparatus disclosed in U.S. Pat. No. 8,967,989 B2, U.S. Pat. No. 9,433,584B2, and U.S. Ser. No. 10/383,826B2, in which a different mechanism is used to perform the feeding of the internal tablet or soft capsule outside the machine's wedge. The apparatus disclosed in these patents includes a feeding system composed of two hoppers, two guides, and multiple grasping claws to deliver in a synchronized fashion the tablets or capsules into the vacuum-generated pockets in the gelatin ribbon. Similar to the aforementioned case, the air entrained outside the machine's wedge and the absence of mediums to extract the said entrained air will cause a major issue of bubbles inside the produced capsules. A similar issue is presented in the apparatus disclosed in WO2012017325A2, where microparticles filled liquid capsules, generating such air spaces by introducing said microparticles outside the machine's wedge. The inconvenience of having large air bubbles inside dose combinations in soft capsules can be seen in two ways. First, the acceptance of the customer of the capsule's appearance, and second, to some active compounds formulated in the liquid phase that are susceptible to oxygen degradation, the presence of air bubbles could generate degradation products in the resulting solid dosage form having a significant effect on the safety and efficacy of said delivered soft capsule. As is the case of unsaturated fatty acids like omega-9, omega-6 and omega-3, or lipids soluble vitamins like vitamin A, D and E, which are highly susceptible to oxidation, when unsaturated fatty acids oxidize, they form a variety of oxidative products like fatty acid peroxides and alcohols, that may affect product shelf life (see Ahmed, M., J. Pickova, T. Ahmad, M. Liaquat, A. Farid, M. Jahangir. 2016. Oxidation of lipids in foods. *Sarhad Journal of Agriculture*, 32(3): 230-238).

The present invention discloses a device with special mechanisms located inside the wedge of the machine configured to manufacture multi-dosage soft gelatin capsules (Unigel® platform), which guarantees the elimination of the air bubbles in the obtained solid dosage forms.

SUMMARY OF THE INVENTION

Figure 1:
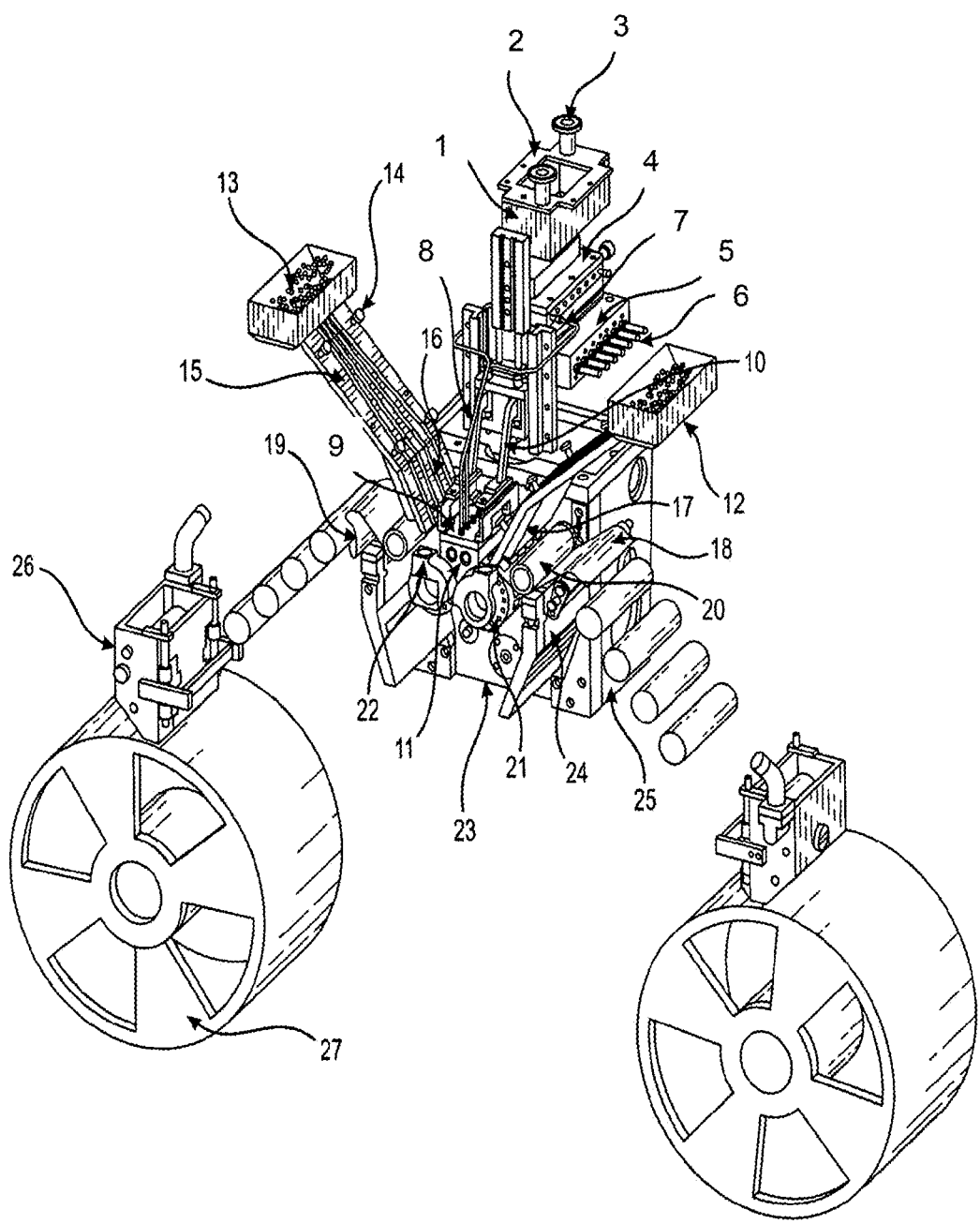
FIG. 1 is a front view of the complete apparatus of the invention showing all the elements of the apparatus.

The invention provides a distributor plate and filling wedge segment for a machine for manufacturing softgel capsules incorporating another solid form within said capsule and wherein said softgel capsule is free of air bubbles and manufactured by the rotary die process, said filling wedge segment comprising two concave wedge surfaces; a filling medicine inlet; a fill medicine outlet; an output of solids and pre-fill medicine; a solids feed channel and pre-fill medicine; a pre-filling medicine inlet and a solids inlet.

The invention also relates to a rotary die mold process for manufacturing softgel capsules incorporating another solid form within said capsule and wherein said softgel capsule is free of air bubbles, in which at least two material strips are brought together by means of counter-running forming rolls and formed into capsules, a liquid and solid filling material being introduced via a filling wedge segment comprising two concave wedge surfaces; a filling medicine inlet; a fill medicine outlet; an output of solids and pre-fill medicine; a solids feed channel and pre-fill medicine; a pre-filling medicine inlet and a solids inlet.

The invention is also directed to a softgel capsule free of air bubbles having incorporated within said capsule a second solid form, said second solid form being the form of a tablet, wherein said softgel capsule product incorporating said second solid form in the form of a tablet, is selected from the group consisting of: (a) a statin as a solid form incorporated into a softgel capsule that contains an omega oil; (b) one softgel capsule contains a non-steroidal antiinflammatory and the solid form incorporated into the softgel capsule that contains the non-steroidal anti-inflammatory contains an antihistamine; and (c) one softgel capsule contains an omega oil and the solid form incorporated into the softgel capsule that contains the omega oil contains a salicylate.

The present invention responds specifically to the long-felt need heretofore unmet by the prior art, and especially with a view to overcoming the inherent inadequacies of combination of pharmaceuticals that are not compatible for oral delivery to mammals. The composition is a pharmaceutical combination i.e., a capsule or other solid form within a capsule which is free of air bubbles and providing the convenience and reliability of oral administration, while providing near simultaneous delivery in vivo of incompatible substances. The composition is shelf stable when formulated.

The foregoing, and other advantages of the present invention, are realized in one aspect thereof in an oral pharmaceutical composition that is a combination of incompatible active ingredients. The composition comprises a double soft capsule which includes one pharmaceutical in a first capsule which is enclosed in a second soft capsule also containing a second active ingredient. The soft capsules are preferably made of gelatin and are free of air bubbles. The active ingredients may be combined with acceptable grade carriers.

In another aspect, the invention is a method of simultaneously delivering incompatible compounds to mammals in vivo. Such delivery is achieved by administering orally to a mammal a double soft capsule containing a first substance in a first capsule, which is enclosed with a second substance, incompatible with the first substance, in a second larger soft capsule which is free of air bubbles.

In another embodiment, this invention provides a method for preparing shelf-stable compositions of incompatible substances, which includes the use of multiple capsules of variable composition. Such method is accomplished manually or by the apparatus of the invention further described below.

As used herein, the term "incompatible" is meant to refer to substances which deleteriously react with one another when combined in desired levels or concentrations.

The invention also provides an apparatus for making softgel capsules free of air bubbles having incorporated therein other solid dosage forms selected from the group consisting of pellets, smaller capsules, smaller tablets, sustained release solid dosage forms, immediate release solid dosage forms, extended release solid dosage forms and zero order release solid dosage forms, said apparatus comprising: (a) two spreader boxes; (b) two casting drums; (c) a pair of rotary dies having means for suction; (d) a liquid fill system; (e) a wedge for heating gelatine ribbons and feeding said fill; and (f) two lateral dispensing devices said lateral dispensing devices including hoppers having said solid dosage forms, channelguides for transporting said solid dosage forms and a grasping claw for dispensing said solid dosage form into the softgel pocket formed in the rotary dies.

The invention further provides a dispensing device for dispensing and feeding solid dosage forms into a softgel capsule which is free of air bubbles said dispensing and feeding device including a hopper having said solid dosage forms, channelguides for transporting said solid dosage forms and a grasping claw for dispensing said solid dosage form.

The instant invention also provides a method for making softgel capsules which are free of air bubbles having incorporated therein other solid dosage forms, said method comprising: casting a gel forming composition to make films; (b) passing said films through a pair of rotary dies having vacuum means to make pockets; (c) feeding smaller solid dosage forms into said pockets using a lateral dispensing and feeding system that uses a grasping claw; (d) filling said pockets with a medicine formulation in liquid form via a wedge segment; and (e) forming said capsule by sealing the pockets together.

The invention is also a process for making a softgel capsule free of air bubbles having incorporated therein another capsule, said process comprising: (a) feeding film sheets between a first die roll and a second die roll wherein each of the die rolls have capsule pockets in a plurality of rows and said capsule pockets have at least one orifice for application of suction; (b) applying suction while said film is in place in the capsule pockets; (c) feeding via guidechannels through a lateral dispensing device having a hopper and a grasping claw preformed smaller capsules onto the film sheets overlying the die rolls at positions having the capsule pockets; (d) filling said capsule pockets also via a wedge segment with a liquid medical formulation; and (e) cutting the film sheets about the capsule pockets to form said soft gel capsules having capsules in combination with a suitable liquid pharmaceutical combination.

The invention further provides softgel capsules incorporated into an outer softgel capsule free of air bubbles, tablets incorporated into an outer softgel capsule free of air bubbles, microgranules incorporated into an outer softgel capsule free of air bubbles, and any combination between softgels, tablets and/or microgranules incorporated into an outer softgel capsule free of air bubbles.

The instant invention also provides a softgel capsule free of air bubbles having incorporated therein another solid dosage form selected from the group consisting of: (a) one capsule contains an omega oil and the other solid dosage form is a capsule having a statin; (b) one capsule contains a non-steroidal antiinflammatory and the other solid dosage form contains and antihistamine; and (c) one capsule contains and omega oil and the other solid dosage form contains a salicylate.

Other advantages and a fuller appreciation of the specific adaptations, compositional variations, and physical and chemical attributes of the present invention will be gained upon an examination of the following detailed description of the invention, taken in conjunction with the accompanying drawings and appended claims.

DETAILED DESCRIPTION OF THE INVENTION

Referring in detail to the apparatus shown in FIG. 1, reference numeral 1 illustrates a medicine hopper having a cover 2 and a medicine feeder 3 connected with a clamp. The apparatus further includes a medicine distributor system 4, pump 5 to pump medicine and further includes plonger 6. The apparatus also includes a fitting distributor connection 7, medicine tubing/hoses 8, a segment coupling connection 9, a support segment 10, and wedge segment 11.

The apparatus has lateral hoppers 12 and 13 containing smaller capsules or other solid dosage forms that are intended to be encapsulated by the soft gels being formed in the rotary dies. The lateral hopper dispensing system includes acrylic or other material knob fasteners 14 and acrylic substrate 15 having guide channels/tracks 16 for the smaller capsules or other smaller solid dosage forms such pellets or minitablets, etc. The lateral dispensing system of the invention includes a grasping claw 17 for dispensing the smaller capsules coming through channels/track 16. The apparatus further includes the conventional aspects of making softgel capsules which includes a gelatin film 18, guiding rollers 19, tensioner 20, rotary mold 21, a vacuum system 22, capsule exit 23 after the capsule is formed, a yoke support arm 24, housing 25, spreader gel dispensing boxes and casting drum 27.

Figure 2:
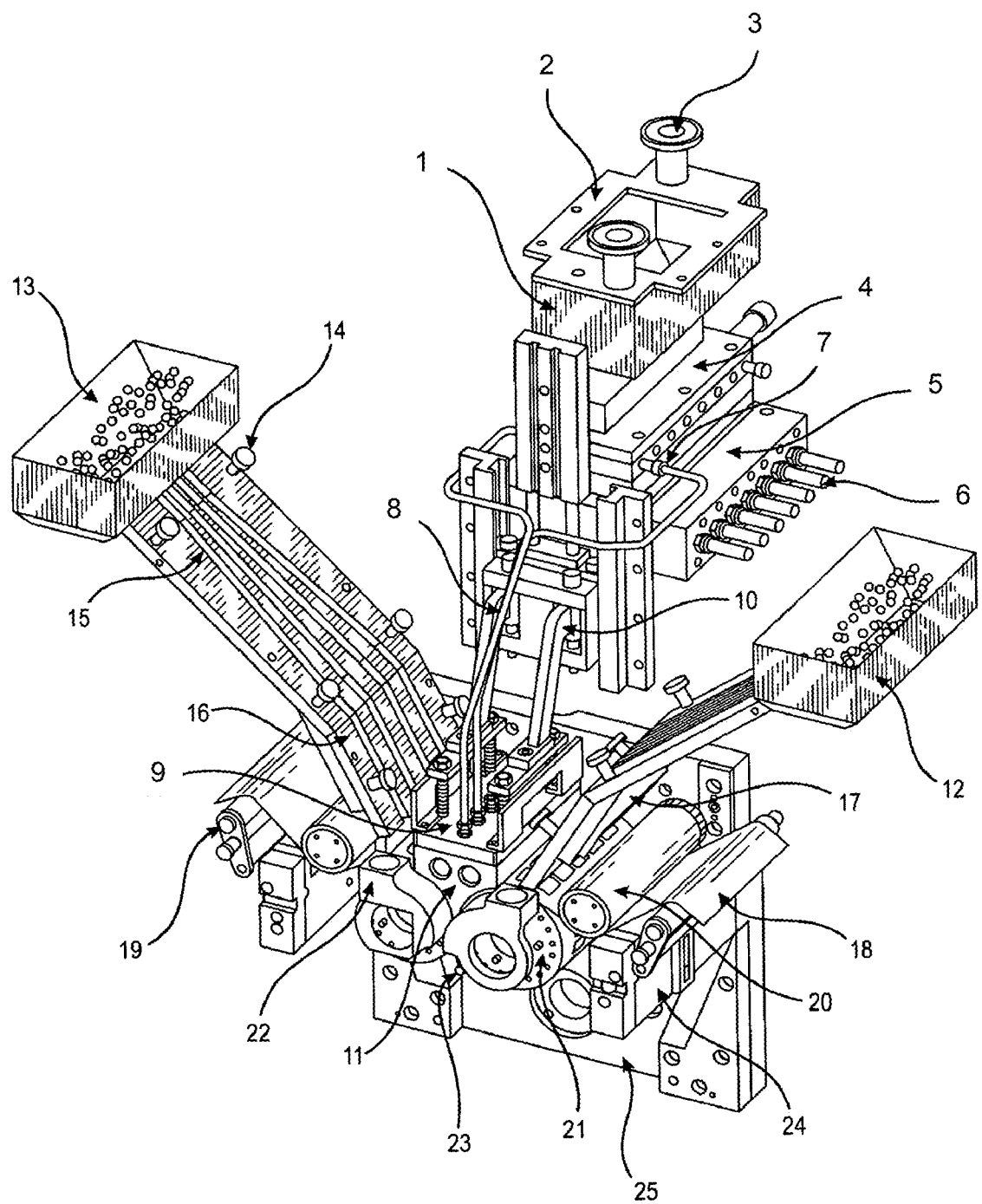
FIG. 2 is also a front view of the apparatus of FIG. 1 without the spreader boxes and casting drums.

FIG. 2 illustrates the apparatus of FIG. 1 without the spreader gel dispensing boxes and casting drums. The reference numerals in FIG. 2 are identical as those in FIG. 1.

The film-forming materials of the invention comprise at least one component selected from the group consisting of gelatin, starch, carrageenans, gums or synthetic materials such as hydroxypropyl-methyl-cellulose (HPMC), other hydroxyalkylated celluloses and the like. The film-forming material typically has an aqueous base and is considered to be ingestible. As used herein, the term "ingestible" is used to indicate a film-forming material that dissolves under conditions simulating the human digestion tract or water.

Figure 3:
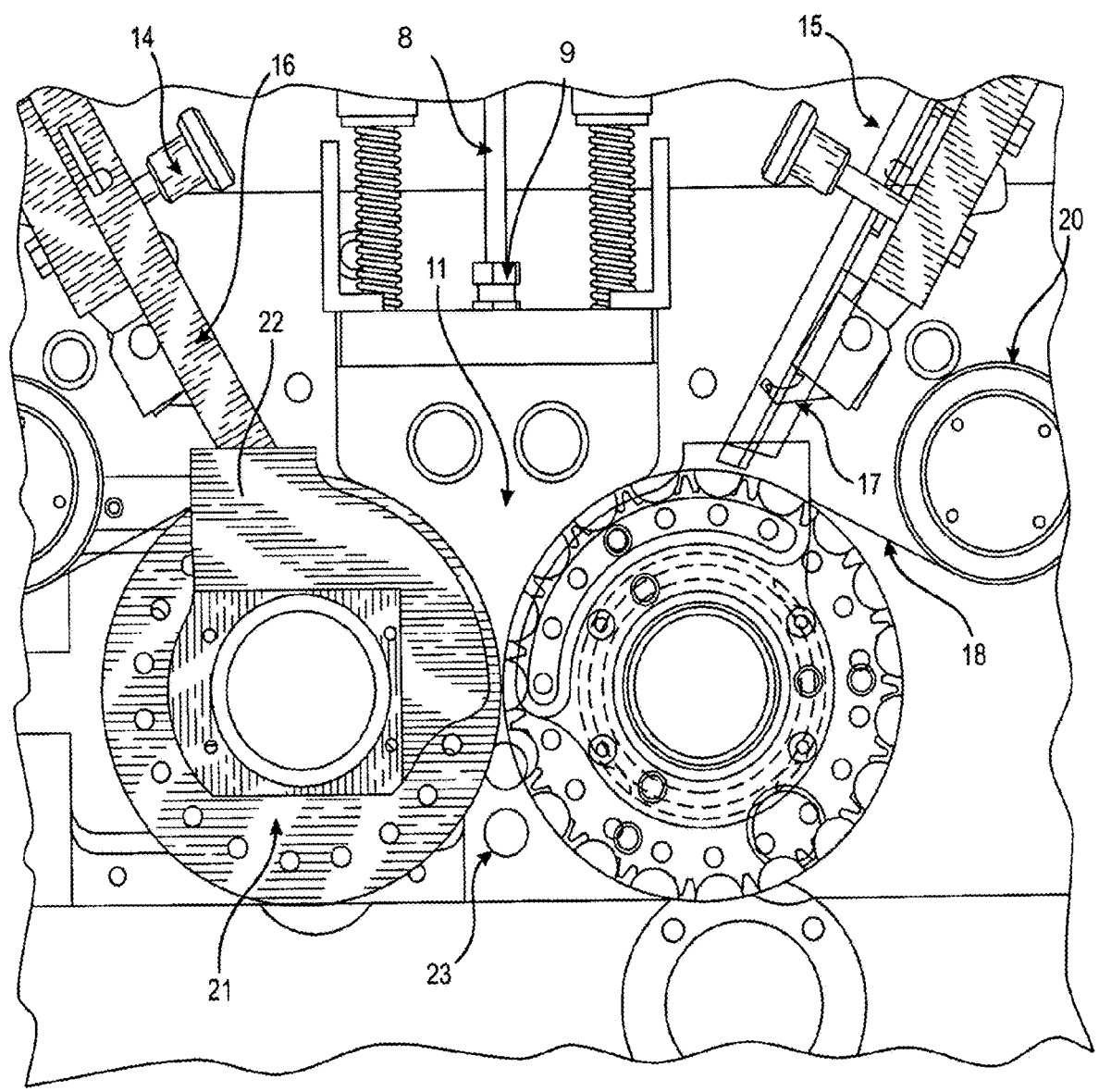
FIG. 3 is a front view of the mechanism for filling the capsules with other capsules.

FIG. 3 shows the dispensing and feeding of solid dosage forms or capsules that come from hoppers 12 and 13 (not shown-See FIGS. 1 and 2) controlled by grasping claw 17 with volume capacity for accurate dosing fixed within the capsule. The smaller dosage form or smaller capsules is fed through guide channels 16 and deposited inside a half pocket as the softgel capsule is being formed in rotary die 21. The grasping claw 17 releases each capsule into each packet as the rotary die moves. The final capsule is also filled with additional pharmaceutical actives in liquid form injection tubing 8. After filling the formed capsule 23 falls-through to a conveyor belt and then transported for drying.

Figure 4:
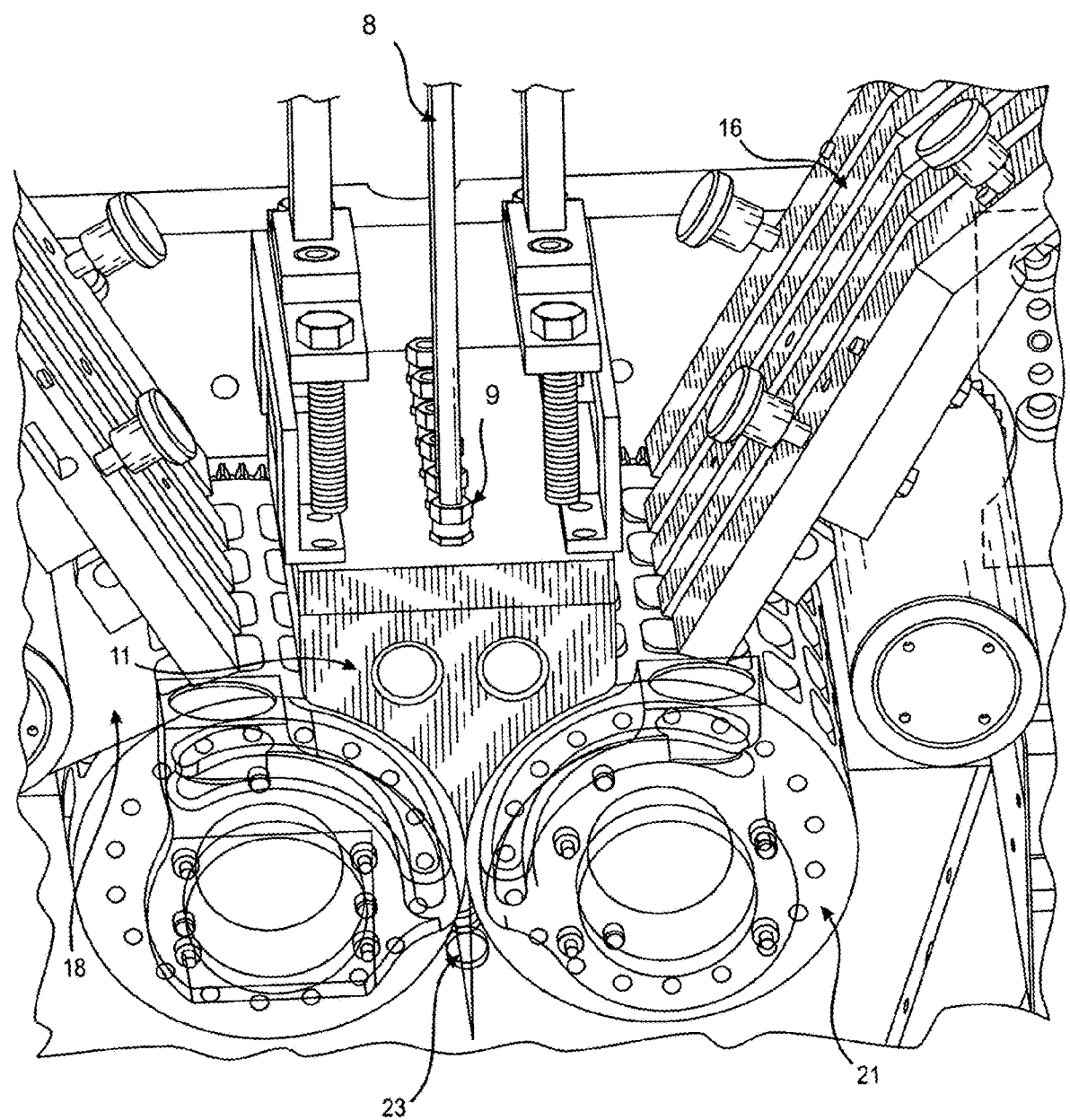
FIG. 4 is also a front view of how the smaller capsules are dispensed into the larger capsule.

FIG. 4 further illustrates in more details the feeding of solid dosage forms or capsules into the rotary molding process for making softgel capsules containing internally other dosage forms such as smaller capsules, pellets, small tablets, etc. The feeding of the internal capsule is made by an independent dispenser having guide channels 16 so that as capsules are deposited in the pocket of the rotary die/mold 21, the wedge segment 11 is used to simultaneously dispense a liquid medicine product to fill the capsule. As is well known gelatin film 18 is used to form the softgel pocket in the rotary die/mold 21.

Figure 5:
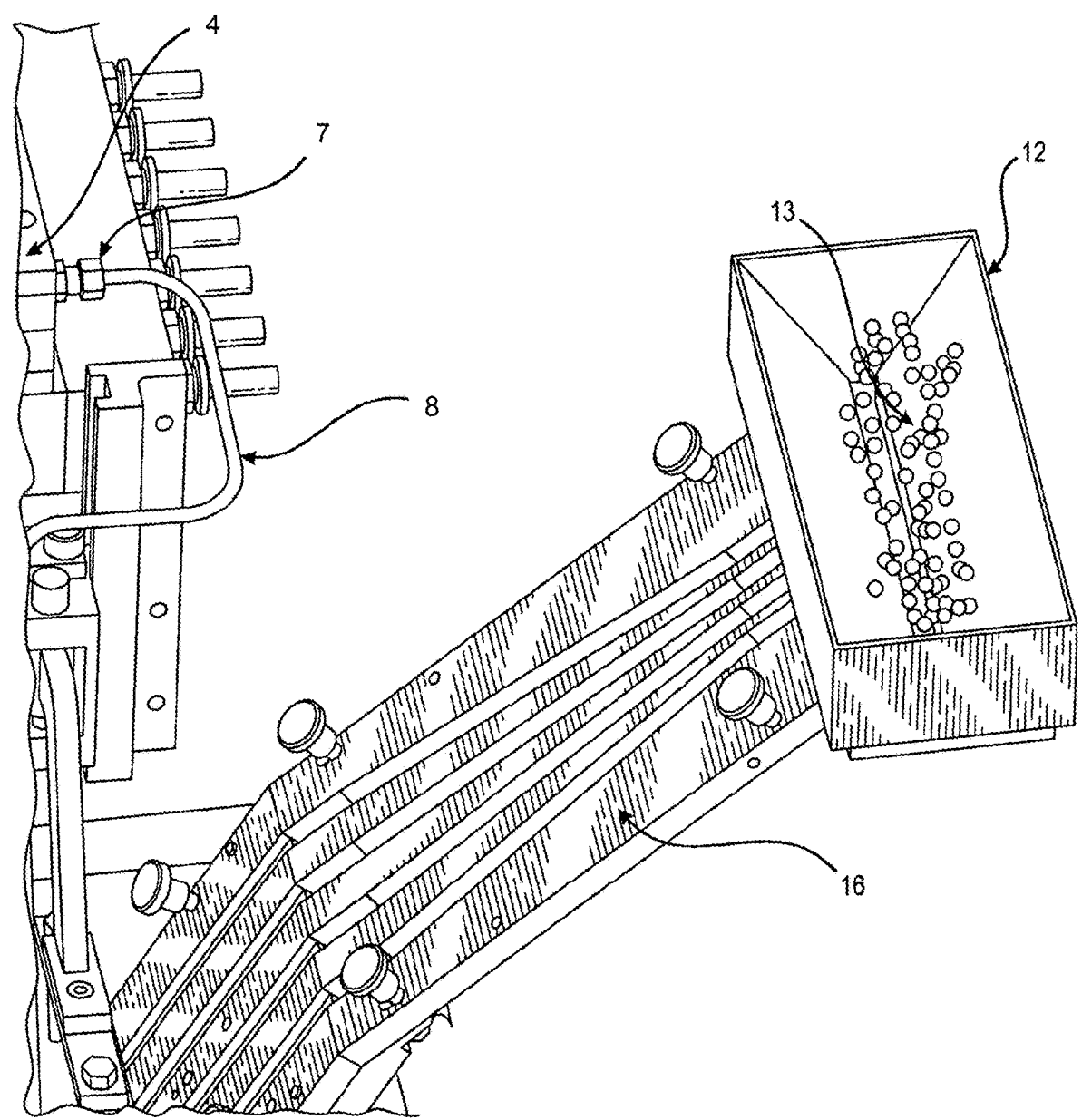
FIG. 5 shows the smaller capsule hopper having capsules which are fed via guiding channels into the larger capsule.

FIG. 5 shows one of the lateral hoppers having smaller solid dosage forms or smaller capsules to be filled inside another softgel capsule. The hopper 12 having capsules 13, are released from the hopp-er and deposited and guided through guidechannels 16 which in turn leads to the pocket in the rotary mold that is in a tangential position.

Figure 6:
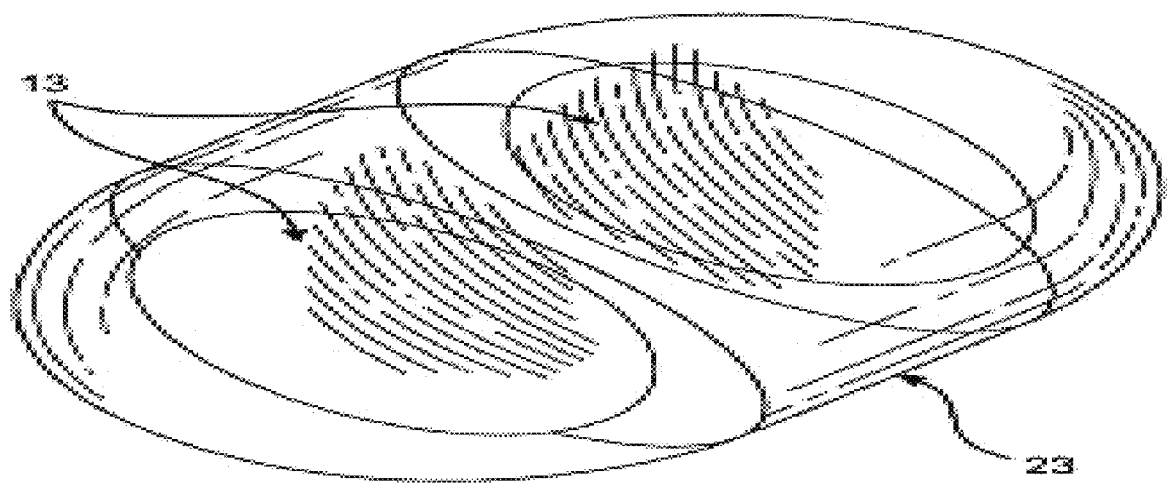
FIG. 6 shows a representative end product of the invention containing two capsules inside another capsule.

FIG. 6 illustrates a finished capsule of the invention. One or more smaller capsules may be encapsulated in any way into another immersed in a liquid or solution containing a pharmaceutical active ingredient.

Figure 7:
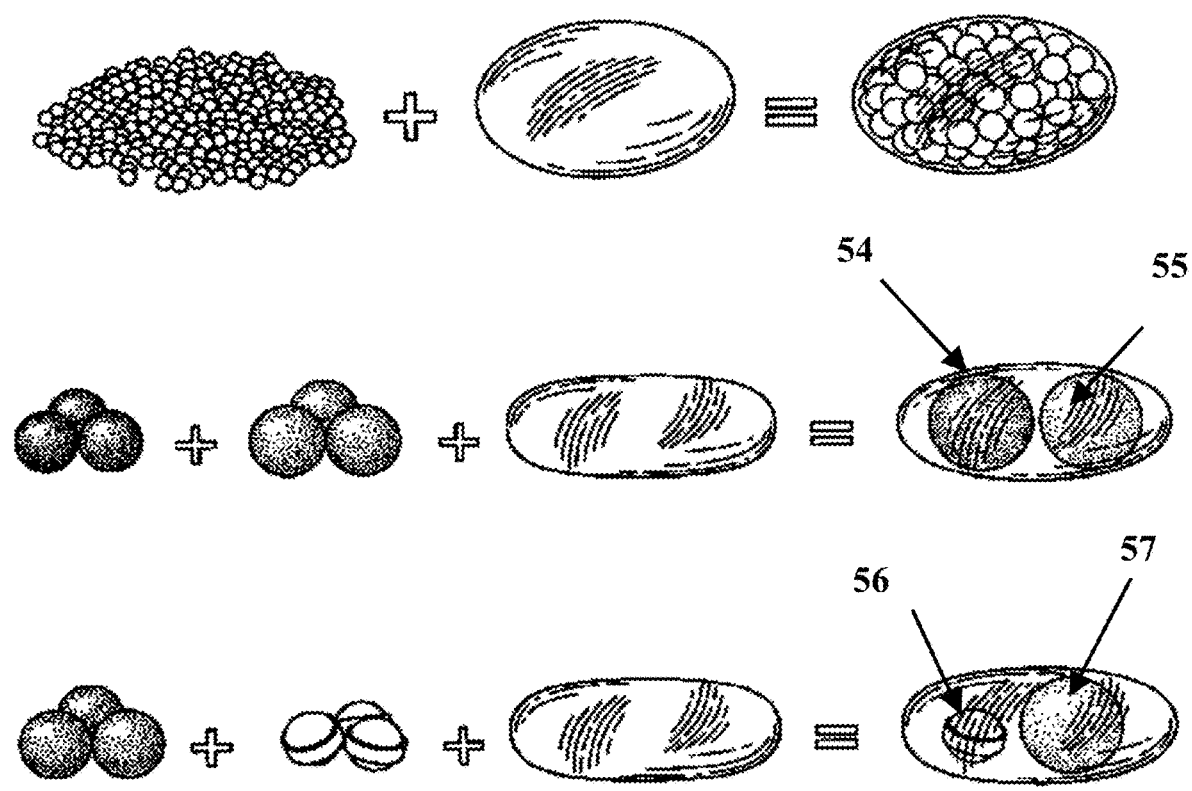
FIG. 7 are representative examples of products contemplated by the invention.

FIG. 7 shows shows several versions of the products of the inversion wherein reference numeral 54 denotes an immediate release solid dosage form and reference numeral 55 denotes an extended release dosage form, while reference numeral 56 and 57 are solid dosage forms of two different drugs exhibiting extended release.

The System to Prevent Air Bubbles

The system and apparatus of the invention is designed to be used as an additional component of the Unigel® platform, and whose purpose is to eliminate the air bubble that accumulates inside the soft capsules during the formation process. This air bubble is inherent in the production of this oral dosage form.

The term Unigel within the context of the instant invention refers to Softgel capsules having other solid dosage forms within said capsules as further disclosed and exemplified in our U.S. Pat. Nos. 9,433,584; and 10,383,826 the contents of which are incorporated by reference in their entirety.

To achieve air displacement within the capsules, a subsystem of the Unigel platform was designed, manufactured and put into operation, which is adapted in the same original Unigel system and in the same conventional encapsulating machine, without affecting its structural designs or its operating principles.

The invention achieves the displacement of the air bubble inside a Unigel softgel, but its scope includes the displacement of any substance or mixture in a gaseous or liquid state, inside a Unigel softgel or inside a softgel.

Figure 8:
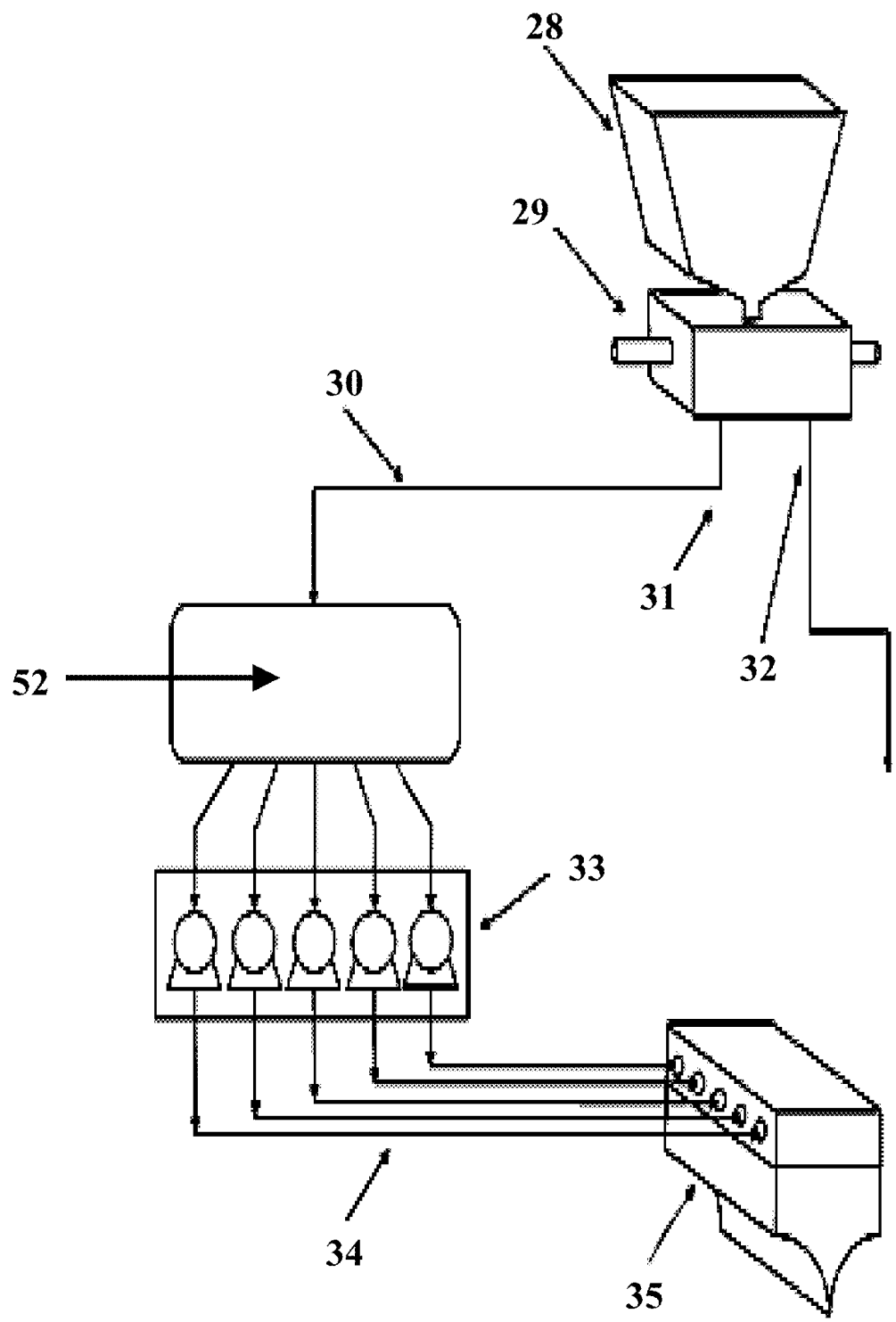
FIG. 8 is a diagram of the components of the pre-filling system.

The conceptual scheme of the system is illustrated schematically in FIG. 8. Referring to FIG. 8 describing the pre-filling system for carrying out the invention, reference numeral 28 is a hopper containing a medicine comprising a pharmaceutical active and reference numeral 29 represents a dosing pump. The dosing pump includes an outlet pre-filling system 31, an outlet filling system 32 and a feeding hose 30 providing medicine to the pre-fill medicine dispenser 52. The system further includes pre-filling pumps 33, dosing hoses 34 and a distributor plate and segment 35.

The medicine hopper 28 and dosing pump 29 are conventional dosing pumps and medicine hoppers that are used in softgel capsule manufacturing. In general, piston pumps are used through which the total filling of the capsule is metered as a function of the diameter and the stroke of the pistons. However, within the scope of the invention any type of pumping system that is used to fill the capsules can be utilized.

The supply hose 30 is a feeding hose for the amount of pre-fill medicine required for the total number of capsule samples that the mold of the encapsulating machine will have that is required to be dosed. The hose 30 leads the pre-fill medicine from the dosing pump to the pre-fill medicine dispenser 52.

The pre-fill medicine dispenser 52 is a device that consists of a chamber that, through a single inlet, receives the pre-fill medicine sent by the dosing pump 29 through the feeding hose 30. Through a design of internal channels, this device distributes the received medicine in a homogeneous and equitable way, and doses it through several outlets, each of which will feed pre-fill pumps 33. The number of outlets will depend on the mold and the product being encapsulated.

The pre-fill pumps 33 are a set of high precision pumps, which receive the medicine from the pre-fill medicine dispenser 52. They are in charge of sending the pre-fill through the dosing hoses 34, towards the distributor plate system of the segment 35. In general, rotary piston pumps are used, special for small doses. However, within the scope of the invention, this system includes any type of pumping system that is used to pre-fill the capsules.

The dosing hoses 34 receive the pre-fill medicine delivered by the pre-fill pump system 33 and transport it to the distributor plate and segment system 35. Each hose will feed one channel of the distributor plate.

Figure 9:
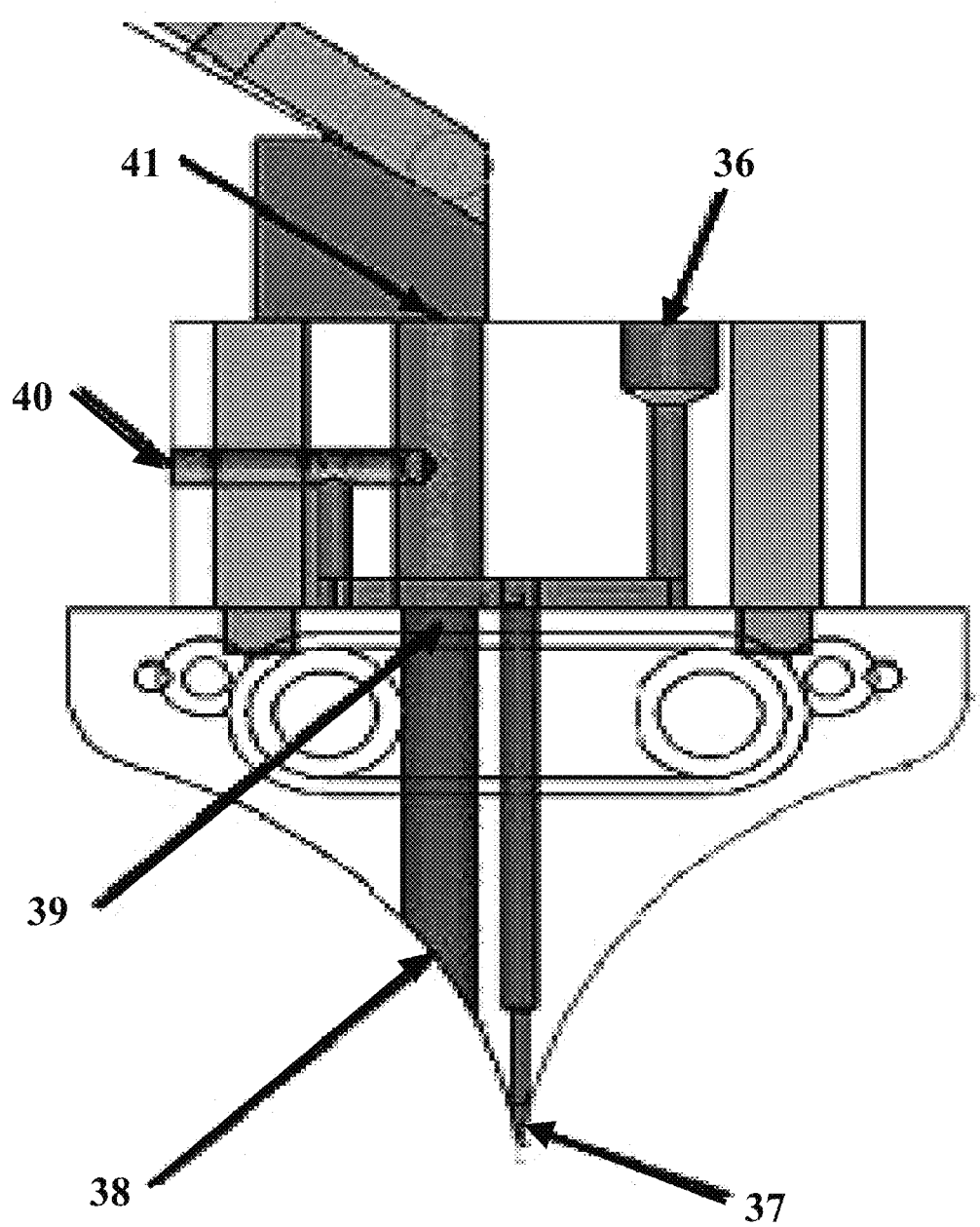
FIG. 9 shows the distributor plate and segment system of the apparatus of the invention.

The distributor plate and segment system 35 is aimed at supplying heat so that the gelatin films reach the glass transition temperature for sealing the capsules, as well as supplying the liquid inside the soft capsules. In the case of the pre-filling system 31 for displacement of the bubbles, this system fulfills the additional function of supplying the solids inside the soft capsules, while supplying, on the one hand, the pre-filling dose that will displace the air bubble, and on the other hand, the remaining content that each capsule must carry, to complete 100% of the nominal theoretical dosage of the product to be encapsulated. The system is designed with internal feed channels in addition to the conventional design, which are through and allow the dosage of the pre-fill medicine, the fill medicine, and the passage of solids into the Unigel softgels. FIG. 9 illustrates this component.

As shown in FIG. 9, the distributor plate and segment system includes a filling medicine inlet 36, a fill medicine outlet 37, an output of solids and pre-fill medicine 38, a solids feed channel and pre-fill medicine 39, a pre-filling medicine inlet 40 and a solids input 41.

The Stages of the Process (A) The pre-filling system 31 and 52 is fed with the same medicine contained in the medicine hopper of the encapsulating machine, and which will be the same that will be used for the dosage of the Unigel capsules. In the set-up of the process, the percentage of the total dosage of the medicine that will be supplied through the pre-filling system is established. This amount depends on the type of product to be encapsulated, and the size of the solid that will go inside the Unigel. The difference between the total of the nominal theoretical dosage of the product, minus what is defined to be fed by the pre-filling system, will be the amount that will be parametrized to be dosed through the conventional soft capsule injection process. The amount fed by the dosing pump to the conventional injection system of the machine, added to the amount fed to the pre-filling system, constitutes 100% of the nominal theoretical dosage of the product. The operating parameters of the system, as well as the percentages of medicine to be dispensed through the pre-filling channels and the injection system of the machine, are defined according to the product, the size of the Unigel capsule and the size of the internal solid.

(B) The total product supplied by the dosing pump 29 to the pre-fill system 31 and 52, travels through the supply hose 30, to the pre-fill medicine dispenser 52. This device receives the medicine and, through an internal channel design, distributes it evenly over the number of samples in the mold. Each of the outlet channels of the distributor will feed a pre-fill pump 33. The number of outlet channels in dispenser 52 and pre-filling pumps 33 will depend on the mold and the product to be encapsulated. The pre-fill pumps 33 accurately and precisely dose the pre-fill medicine dose for each capsule, and dispense it into the segment, through the dosing hoses 34. This amount depends on the type of mold, the type of product to be encapsulated, and the size of the solid that will be included in the Unigel.

(C) The distributor plate and segment assembly 35 receives, through each of its inlet channels, the medicine dosed by the pre-fill pumps 33. Through a system of internal channels, the distributor plate receives the pre-fill dose through a side inlet 40, and the Unigel solid through a top inlet 41. Both (pre-fill and solid medicine) run down the feed chute 39. When the solid exits the feed channel 38 and makes contact with the gelatin film, a deformation of the gelatin film is generated, which in turn generates air chambers. This effect is illustrated in FIG. 10.

Figure 10:
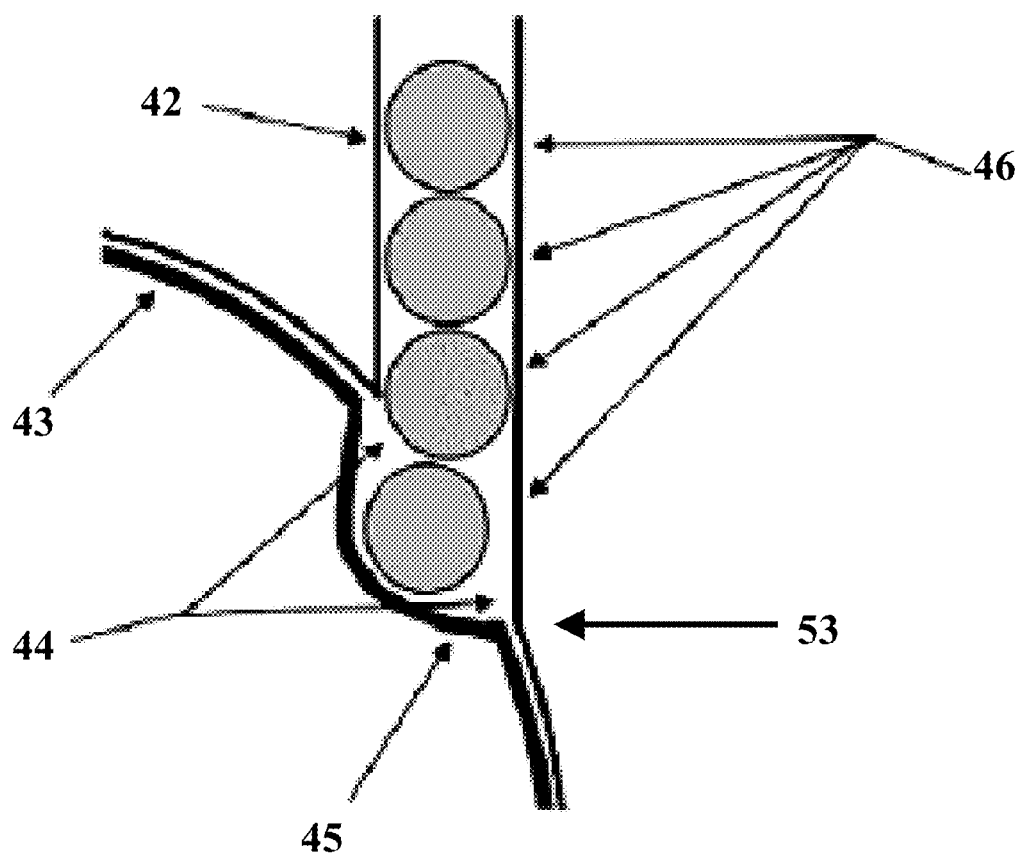
FIG. 10 illustrates the effect of air chamber formation in the Unigel process of the invention.

In FIG. 10, there is illustrated the effect of air chamber formation in the process of the invention (Unigel process) where reference numeral 42 illustrates a feeding channel, while reference numeral 43 shows the gelating film. Reference numeral 44 illustrates the air chambers and reference numeral 45 shows the film deformation. The solid forms of the invention are shown as reference numeral 46 and the segment (not fully shown) as reference numeral 53.

(D) The system is synchronized so that, at the same moment, it injects the pre-filling dose into the chambers formed in the gelatin film and so that, due to the effect of gravity, it displaces the air housed in those chambers. The same timing of the system allows the air dislodged by the pre-fill medicine to vent to the outside, through the same channel for feeding the solids. The vent occurs just before, due to the rotation of the mold, the gelatin film closes the feeding channel. This prevents air from being trapped inside the capsule. See FIG. 11.

Figure 11:
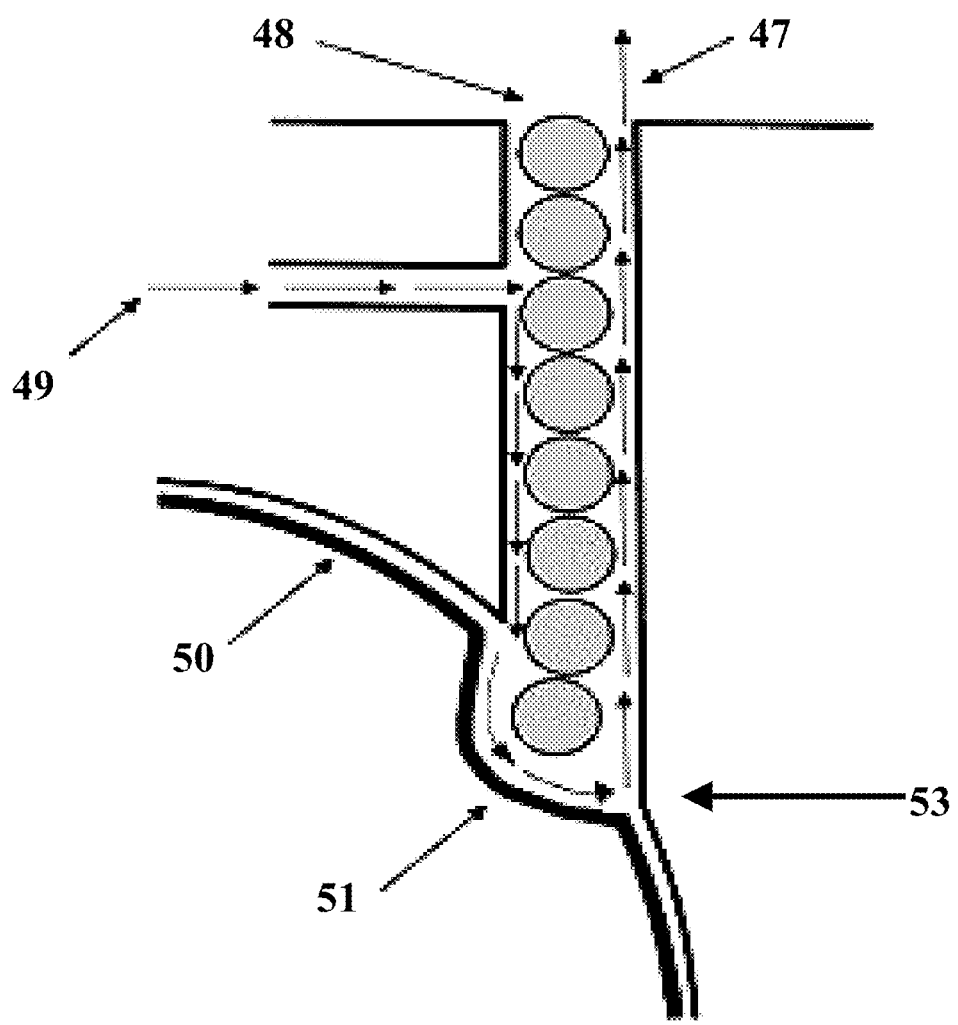
FIG. 11 is a diagram of the air displacement effect.

In FIG. 11, the diagram illustrates the air displacement effect where reference numeral 47 shows the air exit and venting, and reference numeral 48 shows the solids inlet. The prefill medicine inlet is illustrated as reference numeral 49 while reference numeral 50 designates a gelatin film and reference numeral 51 shows film deformation. The segment (not shown) is illustrated as reference numeral 53.

(E) With the rotation of the mold, both the solid and the pre-fill medicine move to the point of forming the capsule contained on the face of the segment. Upon reaching the apex of the segment, the capsule forming process occurs in the conventional manner, beginning with the bottom seal. Then the injection of the filling medicine will be given which, in this case, when added with the pre-filling medicine, completes 100% of the nominal theoretical dosage of the product. Subsequently, the upper seal of the capsule is formed, and when the solid content remains inside, the Unigel is obtained without a bubble inside.

The resulting products of the invention include softgel capsules free of air bubbles having incorporated therein another solid dosage form selected from the group consisting: (a) one capsule contains an omega oil and the other solid dosage form is a capsule having a statin; (b) one capsule contains a non-steroidal antiinflammatory and the other solid dosage form contains and antihistamine; and (c) one capsule contains and omega oil and the other solid dosage form contains a salicylate.

Typically the omega oil is an omega-3 oil and the statin is selected from the group consisting of mevastatin, lovastatin, pravastatin, fluvastatin, simvastatin, rosuvastatin, cerivastatin and atorvastatin and derivatives and analogs thereof.

The non-steroidal antiinflammatory acid is selected from the group consisting of: ibuprofen, naproxen, benoxaprofen, flurbiprofen, fenoprofen, fenbufen, ketoprofen, indoprofen, pirprofen, carprofen, oxaprozin, pranoprofen, miroprofen, tioxaprofen, suprofen, alminoprofen, tiaprofenic acid, fluprofen, bucloxic acid, indomethacin, sulindac, tolmetin, zomepirac, diclofenac, fenclofenac, alclofenac, ibufenac, isoxepac, furofenac, tiopinac, zidometacin, acemetacin, fentiazac, clidanac, oxpinac, mefenamic acid, meclofenamic acid, flufenamic acid, niflumic acid and tolfenamic acid, diflunisal, flufenisal and piroxicam.

The antihistamine is selected from the group consisting of: diphenhydramine, loratadine, cetirizine, fexofenadine, hydroxyzine, cyproheptadine, chlorphenamine, clemastine and desloratadine.

The salicylate is typically acetylsalicylic acid.

The present invention provides delivery systems which are combined in a highly reliable, easy to use and affordable manufacture that give the resulting dosage form unique characteristics to deliver single or multiple APIs regardless of physical-chemical compatibility and/or stability labilities. The soft-gelatin delivery system can be filled with hydrophilic or lipophilic media to suspend various IR and/or MR dosage forms in drug solutions or plain liquid phases.

The delivery system of the invention is a viable alternative to the manufacturing of IR plus MR combinations in tablets and hard-gelatin capsules while enhancing dosing accuracy and by-passing dissolution barriers and coating issues. It also solves compatibility and stability issues for multivitamins, cold remedies, nutraceuticals and multiple other OTC medications. The invention also allows the formulation of combination products, highly needed to assure patient compliance and allow synergistic clinical effects in a safe and stable dosage form.

The invention also allows for ease of identification by color coding the shell, fill and/or contents minimizing counterfeiting risks.

The present invention also provides delivery systems which are combined in a highly reliable, easy to use and affordable manufacture that give the resulting dosage form unique characteristics to deliver single or multiple APIs regardless of physical-chemical compatibility and/or stability labilities. The soft-gelatin delivery system can be filled with hydrophilic or lipophilic media to suspend various IR and/or ER dosage forms in drug solutions or plain liquid phases.

The delivery system of the invention is a viable alternative to the manufacturing of IR plus ER combinations in tablets and hard-gelatin capsules while enhancing dosing accuracy and by-passing dissolution barriers and coating issues. It also solves compatibility and stability issues for multivitamins, cold remedies, nutraceuticals and multiple other OTC medications. The invention also allows the formulation of combination products, highly needed to assure patient compliance and allow synergistic clinical effects in a safe and stable dosage form.

The invention also allows for ease of identification by color coding the shell, fill and/or contents minimizing counterfeiting risks.

The drugs in the Table 1 below can be manufactured according to the method of the invention in many different release profiles alone or in combination.

TABLE 1

| | | |
|---|---|---|
| Alendronate | Bupropion HCl | Donepezil HCl |
| Acyclovir | Bupropion HCl | Dorzolamide HCl |
| Acyclovir | Buspirone | Doxazosin Mesylate |
| Albuterol Sulfate | Calcitonin-Salmon | Doxepin |
| Alfuzosin HCl | Calcitriol | Enalapril Maleate |
| Alitretinoin | Calcium Acetate | EnalaprilMaleate-Hydrochlorothiazide |
| Allopurinol | Candesartan Cilexetil-Hydrochlorothiazide | Epinephrine |
| Alprazolam | Candesartan Cilextil | Eplerenone |
| Altretamine | Captopril | Escitalopram Oxalate |
| Amiodarone | Carbamazepine | Esomeprazole |
| Amitriptyline | Carbidopa/Levo Sr | Estradiol |
| Amlodipine/Valsartan | Carbidopa/Levo | Estropipate |
| Amlodipine Besylate | Carvedilol | Eszopiclone |
| Amlodipine/Valsartan/HCTZ | Cetirizine HCl | Etodolac |
| Amlodipine/Benazepril | Cevimeline HCl | Etodolac |
| Amoxapine | Chlordiazepoxide | Famotidine |
| Anastrazole | Chlorpromazine HCl | Felodipine |
| Antihypertensive Combinations | Chlorthalidone | Fenofibrate |
| Aspirin | Cholestyramine | Fenofibric Acid |
| Atenolol | Cilostazol | Ferrous Sulfate |
| Atenolol/Chlorthalidone | Citalopram | Finasteride |
| Atorvastatin Calcium | Clindamycin Phosphate | Flecainide Acetate |
| Augmented Betamethasone Dipropionate | Clonazepam | Fluconazole |
| Azathioprine | Clonidine HCl | Fluoxetine |
| Azelastine | Clopidogrel Bisulfate | Fluvoxamine Maleate |
| Azelastine Nasal Spray | Colestipol HCl | Folic Acid |
| Baclofen | Decitabine | Furosemide |
| Belladonna Alkaloids With Phenobarbital | Dexmethylphenidate HCl | Gabapentin |
| Benazepril HCTZ | Dextroamphetamine Sulfate | Gemfibrozil |
| Benazepril | Dextroamphetamine-Amphetamine | Glimepiride |
| Benzonatate | Dextroamphetamine-Amphetamine | Glipizide |
| Benzonatate | Diazepam | Glyburide |
| Benztropine | Diclofenac | Glyburide/Metformin |
| Bethanechol | Dicyclomine | Guanfacine |
| Bicalutamide | Dicyclomine | Haloperidol |
| Bisoprolol/Hctz | Digoxin | Hydralazine |
| Brimonidine Tartrate | Diltiazem | Hydrochlorothiazide |
| Bromocriptine | Diltiazem HCl | Hydrocortisone |
| Budesonide | Diphenoxylate/Atropine | Hydroxychloroquine |
| Bupropion HCl | Divalproex | Hydroxyurea |
| Hydroxyzine HCl | Hydroxyzine Pamoate | Ibuprofen |
| Imatinib | Mometasone Furoate | Quinapril HCl |
| Indapamide | Montelukast Sodium | Quinapril/HCTZ |
| Irbesartan | Mycophenolate Mofetil | Rabeprazole Sodium |
| Irbesartan-HCTZ | Nabumetone | Raloxifene |
| Isoniazid | Naproxen | Ramipril |
| Isosorbide Mononitrate | Niacin | Ranolazine |
| Ketotifen Fumarate | Nifedipine | Repaglinide |
| Labetalol HCl | Nilutamide | Risedronate Sodium |
| Lamotrigine | Nitroglycerin | Risperidone |
| Lansoprazole | Norethindrone | Rivastigmine Tartrate |
| Letrozole | Norethindrone/Ethinyl Estradiol | Ropinirole Hydrochloride |
| Levalbuterol HCl | Nortriptyline HCl | Rosuvastatin Calcium |
| Levetiracetam | Nystatin | Sertraline HCl |
| Levocetirizine HCl | Olanzapine | Sildenefil Citrate |
| Levothyroxine | Omega-3 Ethyl Ester | Simvastatin |
| Liothyronine Sodium | Omeprazole | Spironolactone/HCTZ |
| Lisinopril | Ondansetron | Sprintec |
| Lisinopril/HCTZ | Oxandrolone | Sucralfate |
| Lithium Carbonate | Oxybutynin | Sulfamethoxazole/Trimethoprim |
| Loperamide | Pantoprazole Sodium | Sulfasalazine |
| Loratadine | Paroxetine HCl | Sulfasalazine |

TABLE 1-continued

| | | |
|---|---|---|
| Lorazepam | Pentoxifylline | Sumatriptan Succinate |
| Losartan Potassium | Perphenazine | Tacrolimus |
| Lovastatin | Phenobarbital, Hyoscyamine Sulfate Atropine Sulfate Scopolamine HBr | Tamoxifen Citrate |
| Loxapine | Phenoxybenzamine | Tamsulosin HCl |
| Magnesium Oxide | Phenytoin Sodium | Telmisartan |
| Meclizine HCl | Pioglitazone HCl | Temazepam |
| Medroxyprogesterone Acetate | Potassium Chloride | Terazosin |
| Meloxicam | Potassium Iodide | Testosterone Cypionate |
| Memantine HCl | Pramipexole HCl | Tizanidine |
| Metformin | Pravastatin | Tolterodine Tartrate |
| Metformin | Prazosin | Topiramate |
| Methimazole | Prednisone | Tramadol HCl/Acetaminophen |
| Methocarbamol | Primidone | Tramadol |
| Methotrexate | Prochlorperazine | Trandolapril |
| Methylphenidate HCl | Progesterone | Tranylcypromine |
| Metoclopramide HCl | Propafenone HCl | Trazodone |
| Metolazone | Propranolol HCl | Tri-Previfem |
| Metoprolol/HCTZ | Propylthiouracil | Tri-Sprintec |
| Metoprolol Tartrate | Pyridostigmine Bromide | Triamterene |
| Micronized Glyburide | Quetiapine Fumarate | Triamterene/HCTZ |
| Midodrine HCl | Vitamin D3 | Trifluoperazine HCl |
| Minocycline | Vitamin D3 | Trospium Chloride |
| Minocycline HCl | Warfarin Sodium | Valacyclovir HCl |
| Mirtazapine | Zafirlukast | Venlafaxine |
| Valproic Acid | Zaleplon | Verapamil HCl |
| Valsartan Hydrochloride | Zidovudine | Vitamin B Complex |
| Valsartan/HCTZ | Zolpidem | Vitamin B-6 |

In additional embodiments of the invention, Applicant has discovered that the softgel capsules of the invention can include several Fixed Dose Combinations FDC (i.e., 2 or more APIs) and biphasic release (1 API in immediate and extended release). The fixed dosage forms can be made in the following release profile modes:
1. Immediate release in the liquid content+extended release in the tablet
2. Extended release in the liquid content+extended release in the tablet
3. Extended release in the liquid content+immediate release in the tablet The polymer in the capsule shell could be gelatin either porcine or bovine (type A or type B) or a non-animal polymer such as modified starches, carrageenans or alginates.

When tablets are used for incorporation into the capsule product of the invention, they were coated to avoid the migration from the fill content of the capsule to the tablet core and vice versa in order to guarantee the physical and chemical stability of the APIs. The coating that is applied to the tablet consists of two or more polymers in a range of weight gain from (2-10% for each polymer). The dissolution profiles of the resulting tablets are tested according to the USP dissolution conditions corresponding to each monograph. The soft capsule is attached to the stirrer using a device to avoid that the gelatin shell covers the tablet once it gets soft. Dissolution for immediate release, either in the fill content or the coated tablet meets the dissolution criteria of the corresponding USP monograph (Q+/−5% at 30 or 45 min). The dissolution profiles for extended release in the tablet ranges from 6 to 24 hours.

Regarding the embodiments 1, 2 and 3 above, they are further illustrated below with respect to their contents:
1. Softgel capsule includes an immediate release in the liquid content of the capsule and extended release in the tablet that is incorporated within the capsule. The soft gelatin capsule contains an API BCS class I, II, III, W for both immediate release in the liquid fill content and extended release in the coated tablet. The liquid fill content is an oil, or a polyethylene glycol (PEG) based formulation either as a solution, suspension, emulsion or semisolid. The tablet contains as a matrix for extended release a hydrophilic polymer at different viscosities (1000 to 100.000 cP, preferably Viscosity 2-150.000 mPa·s (2% in water, at 20 C)) and polymer molecular as well as other excipients such as fillers, disintegrants, and lubricants. The tablet is obtained by either of the following processes: wet granulation, dry granulation, spray drying, compression, direct compression, melt granulation or hot melt extrusion. The tablet is coated in order to avoid the migration from the fill content to the tablet core and vice versa in order to guarantee the physical and chemical stability of the APIs. The coating of the tablet consists in two or more polymers in a range of weight gain from (2-10% for each polymer). The dissolution profiles are tested in the USP dissolution conditions corresponding to each monograph. The soft capsule is attached to the stirrer using a device to avoid that the gelatin shell covers the Tablet once it gets soft. Dissolution profiles for extended release in the tablet ranges from 6 to 24 hours.

FIG. 1 shows the extended dissolution profiles of diclofenac tablet cores using a hydrophilic polymer at different viscosities of the polymer for obtaining an extended release matrix. It is appreciated that the dissolution rate can be modified using polymers having different viscosities. In FIG. 2 there is shown an example of the dissolution profile of a dosage form of the invention having a biphasic release from an immediate release fill content and an extended release coated tablet releasing the diclofenac up to 10 hours.

2. Extended release in the liquid content+extended release in the tablet.

The soft gelatin capsule contains an API BCS class I, II, III, IV for extended release in both the liquid fill content and the coated tablet. The liquid fill content is an oil or a PEG based formulation either as a solution, suspension, emulsion or semisolid. The matrix contains a continuous phase and a thickener at different viscosities and molecular weights. As the thickener concentration increases, the viscosity of the gelled matrix increases and it modifies the dissolution rate of the API through the matrix. FIG. 3 shows the effect of the thickener concentration on the % of dissolved API BCS class II.

The tablet contains as a matrix for extended release a hydrophilic polymer at different viscosities (1000 to 100.000 cP preferably Viscosity 2-150.000 mPa·s (2% in water, at 20 C)) and polymer molecular weights as well as some other excipients such as fillers, disintegrants, and lubricants. The tablet is obtained by either of the following processes: wet granulation, dry granulation, spry drying, compression, direct compression, melt granulation or hot melt extrusion.

EXAMPLE

Figure 12:
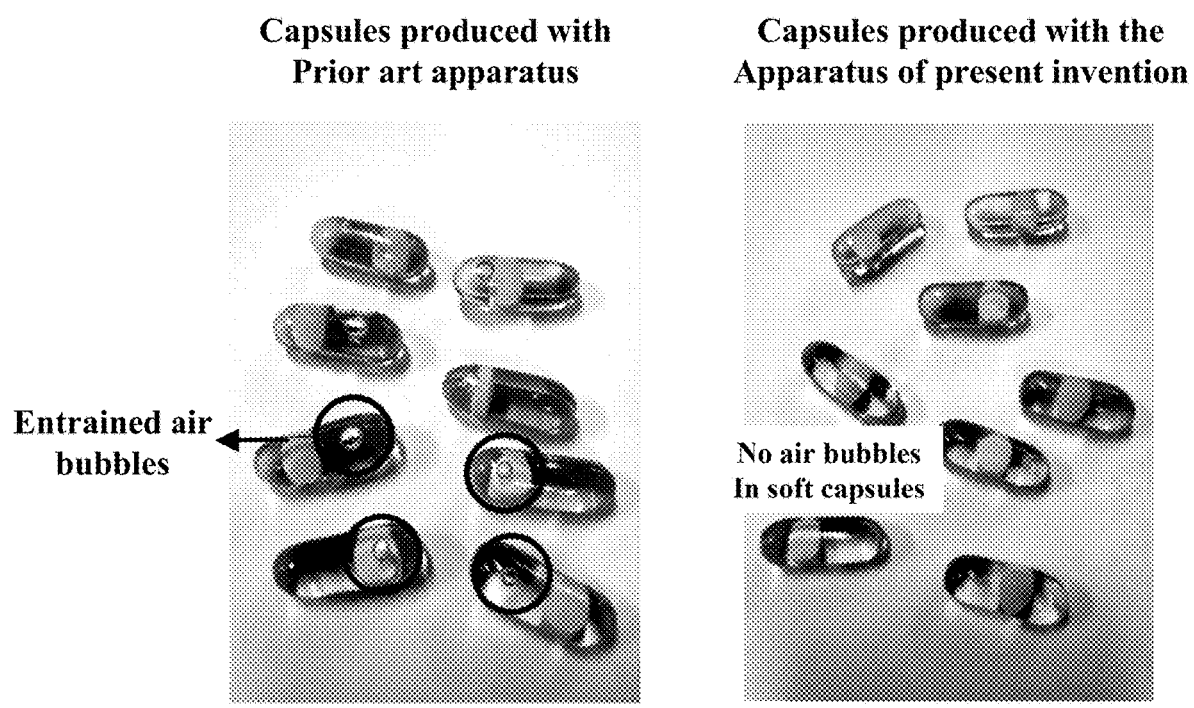
FIG. 12 shows a comparison between products having dose combinations of soft capsules before and after using the apparatus of the present invention.

FIG. 12 shows comparison of dosage form combination soft capsules using the apparatus disclosed in U.S. Pat. No. 8,967,989 B2, U.S. Pat. No. 9,433,584B2, and U.S. Ser. No. 10/383,826B2 patents (Capsules produced with the previous apparatus) and soft capsules produced with the apparatus of the present invention. Liquid fill formulation, die roll, and tablet sizes are the same in both cases; the main difference between these capsules is the use of the apparatus of the present invention. As can be seen in the pictures, the apparatus of the prior art generates bubbles inside the produced capsule, which could be troublesome for some active compounds susceptible to oxygen degradation.

All patents, patent applications and publications cited in this application including all cited references in those applications and publications, are hereby incorporated by reference in their entirety for all purposes to the same extent as if each individual patent, patent application or publication were so individually denoted.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting.

It is to be understood that the terms used herein are merely descriptive rather than limiting and that various changes, numerous equivalents may be made without departing from the spirit or scope of the claimed invention.

What we claim is:

1. A distributor plate and filling wedge segment for a machine for manufacturing softgel capsules incorporating a solid form within said capsule and wherein said softgel capsule is free of air bubbles and manufactured by a rotary die process, said distributor plate and filling wedge segment comprising:
   two concave wedge surfaces;
   inlet channels;
   a system of internal channels;
   a side inlet for injecting prefilling doses for displacing air;
   a top inlet for solid forms;
   a feed chute for both the injected pre-fill and solid forms; said feed chute providing spaces for air displacement by the injected prefilling doses and air exits;
   and a feed channel through which solid forms exits.

2. A machine for manufacturing softgel capsules incorporating a solid form within said capsule, by a rotary die process said machine comprising at least one distributor plate and filling wedge as claimed in claim 1, and at least two counter-rotatable forming rolls for bringing together at least two material film strips and forming them into capsules.

3. A rotary die mold process for manufacturing softgel capsules incorporating a solid form within said capsule and wherein said softgel capsule is free of air bubbles, the process comprising, that at least two material film strips are brought together by means of counter-running forming rolls and formed into capsules, a liquid and solid filling material being introduced via a distributor plate and filling wedge comprising:
   two concave wedge surfaces;
   inlet channels;
   a system of internal channels;
   a side inlet for injecting prefilling liquid medicine doses for displacing air;
   a top inlet for solid forms;
   a feed chute for both the injected pre-fill liquid medicine and solid forms said feed chute providing spaces for air displacement by the injected prefilling doses and air exits;
   and a feed channel through which solid forms exits;
   wherein when the solid form falls onto the film strip, the film strip separates from the outer wall of the segment, deforming to adapt to the solid form shape profile leading to formation of air chambers trapped between the film strip and the segment;
   synchronizing the process so that injection of prefilled liquid medicine occurs at the instant the film strip separates from the outer wall of the segment, therefore filling the air chambers formed during the film deformation process and allowing said injected prefilled medicine to displace the previously contained air;
   wherein the air displaced by the prefilled medicine vents to the outside through the solid form feed channel and said venting occurs just before the film strip closes the solid form feed channel as the mold rotates;
   and wherein after an upper seal of the capsule is formed, and when the solid form remains inside, a Unigel capsule is obtained without a bubble inside.

4. The process of claim 3 wherein said venting prevents air from being trapped inside the capsule.

5. The process of claim 3, wherein with the rotation of the mold, both the solid forms and the pre-fill medicine move to the point of forming the capsule contained on the face of the filling wedge segment.

6. The process of claim 3, which upon reaching the apex of the filling wedge segment, the capsule forming process occurs beginning with a bottom seal.

7. The process of claim 3, wherein the amount of solid forms fed to the pre-filling system constitutes 100% of the nominal theoretical dosage of the product.

* * * * *